May 2, 1933.  A. O. HURXTHAL  1,907,199
COOKING UTENSIL
Filed July 27, 1927   3 Sheets-Sheet 1

Inventor:
Alpheus O. Hurxthal
by his Attorneys
Howson & Howson

May 2, 1933. A. O. HURXTHAL 1,907,199
COOKING UTENSIL
Filed July 27, 1927 3 Sheets-Sheet 2

Inventor:
Alpheus O Hurxthal
by his Attorneys
Howson Howson

May 2, 1933. A. O. HURXTHAL 1,907,199
COOKING UTENSIL
Filed July 27, 1927 3 Sheets-Sheet 3
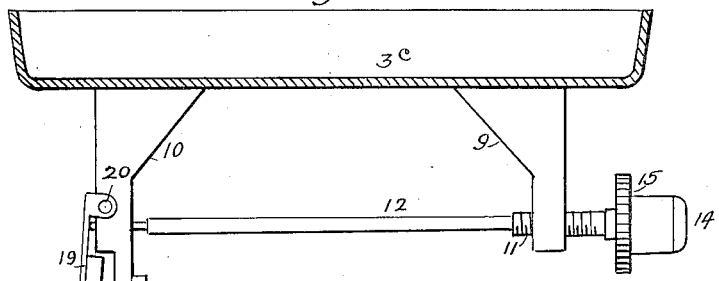
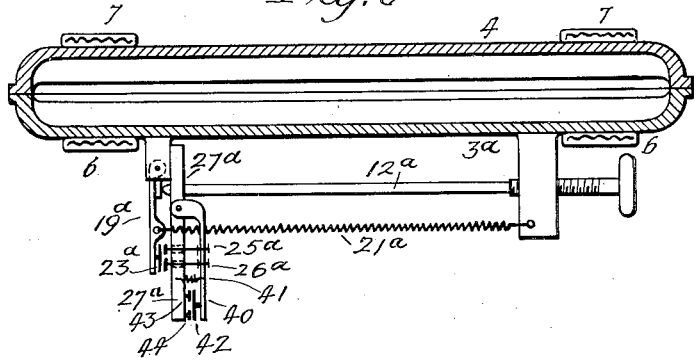
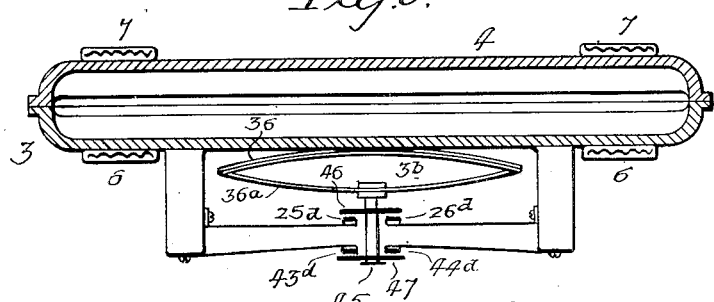
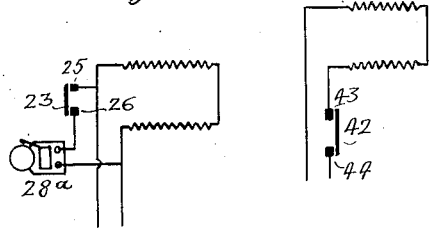
Inventor:
Alpheus O. Hurxthal
by his Attorneys
Howson & Howson Patented May 2, 1933

1,907,199

UNITED STATES PATENT OFFICE

ALPHEUS O. HURXTHAL, OF PHILADELPHIA, PENNSYLVANIA, ASSIGNOR, BY MESNE ASSIGNMENTS, TO PROCTOR & SCHWARTZ ELECTRIC COMPANY, OF PHILADELPHIA, PENNSYLVANIA, A CORPORATION OF PENNSYLVANIA

COOKING UTENSIL

Application filed July 27, 1927. Serial No. 208,829.

This invention relates to waffle or similar cooking utensils having a cooking plate, and contemplates the provision of heat-responsive means arranged so as to be influenced or controlled by the surface temperature of the material being cooked, to actuate a signal, a heat-controlling means, or both, under certain predetermined conditions. The principles involved are similar to those involved in the apparatus disclosed in United States Letters Patent No. 1,540,628, dated June 2, 1925, to Frederick E. Hurxthal and Alpheus O. Hurxthal. I have discovered that in a waffle or similar cooking utensil having a relatively thin cooking plate of high heat conductivity, the temperature of the cooking plate varies in such relation to the surface temperature of batter that it has a definite value corresponding to a definite value of said surface temperature, and therefore the cooking plate temperature may be used to control actuating means for a signal, heat-controlling means, or both, so that, in effect, the actuating means is controlled by the surface temperature of the material being cooked.

The present invention contemplates the provision of actuating means, as above mentioned, in such relation with the cooking plate so as to be controlled by the temperature of the plate.

The general object of my invention is to provide means for automatically controlling the heat of a waffle iron or other cooking utensil and an automatically controlled signal, so that, in the case of a waffle iron, the device will indicate when the waffle iron is of the proper heat to receive the batter, and when the batter has been placed in the waffle iron the signal will indicate when the waffle is properly cooked and the heat will be automatically cut off from the iron.

While I have shown my invention in connection with a waffle iron, it can be used for controlling the heat of any cooking vessel or utensil where a certain degree of heat is required to properly cook a batter or other food product.

While my invention is particularly adapted for electrically heating a waffle iron or other utensil, it is not restricted to the use of electric current as a heating medium, as gas or other heating elements may be used which would cause the plate upon which the material is placed to properly vary in temperature.

In the accompanying drawings:

Figs. 8 and 9 are sectional views illustrating modifications of the invention;

Fig. 10 is a view of another form of cooking utensil embodying my invention;

Figs. 11, 12 and 13 are views of different wiring combinations.

Figure 1:
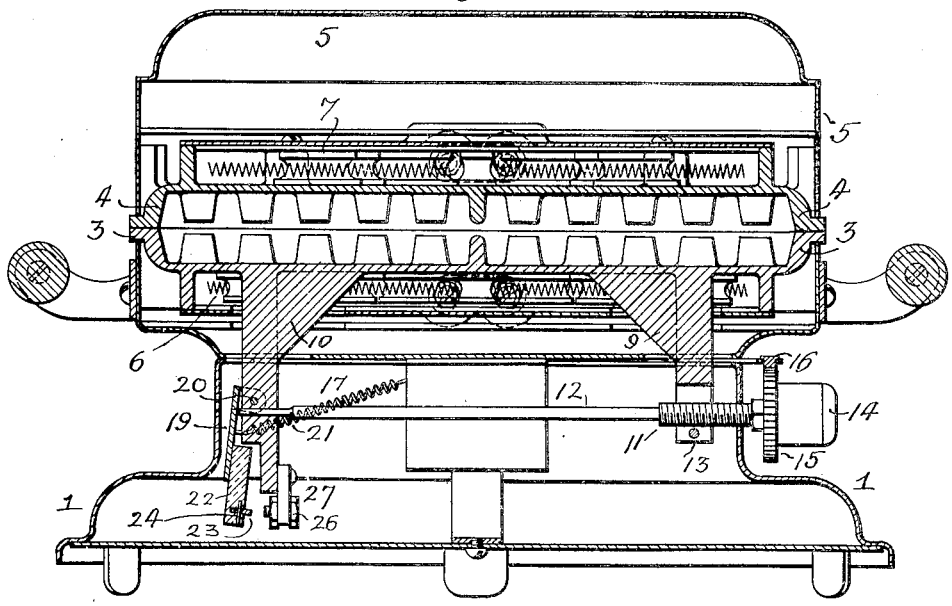
Fig. 1 is a sectional elevation of a waffle iron illustrating my invention.
Figures 4, 6:
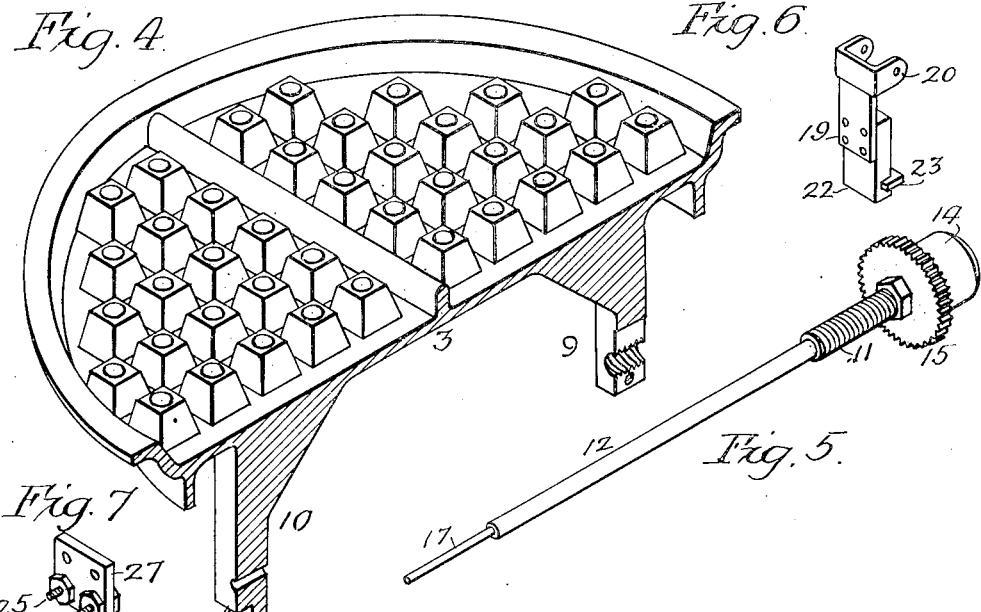
Fig. 4 is a detached perspective sectional view of the lower plate of the waffle iron.
Figs. 5, 6 and 7 are detached views illustrating certain devices of the control system.
Figures 5, 7:
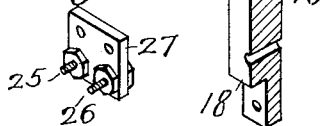
Figure 2:
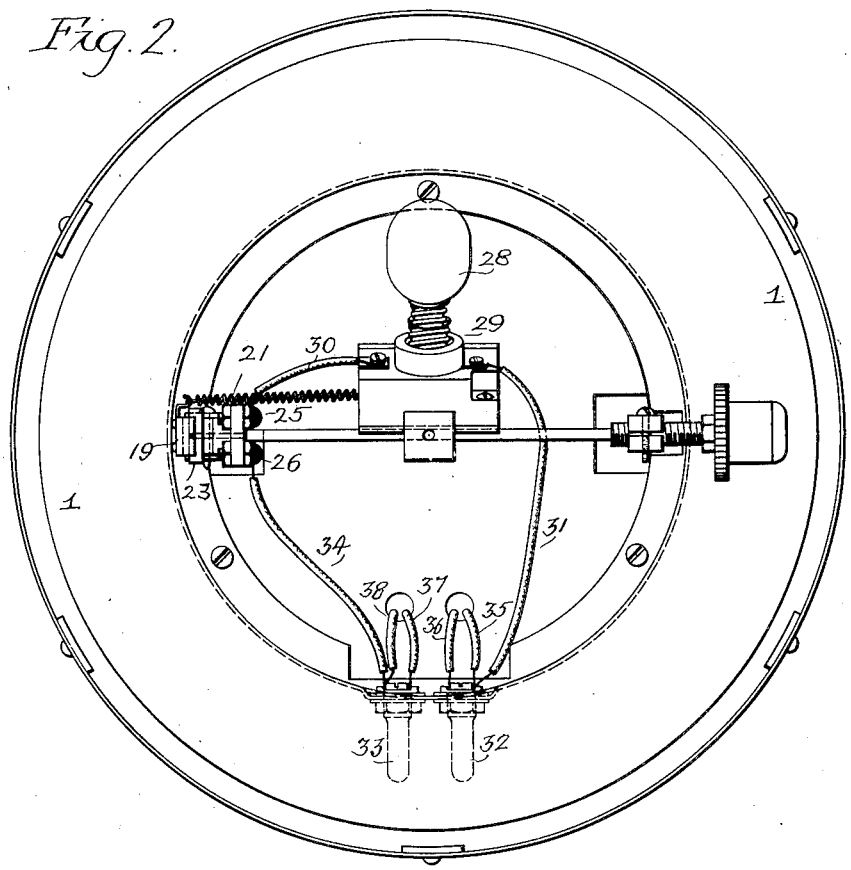
Fig. 2 is an inverted plan view.

Referring to Figs. 1 and 2, 1 is the base of the cooking utensil which may be of any design desired, the upper portion of the base being shaped to receive the lower plate 3 of a waffle iron. 4 is an upper plate which is located within the casing 5 pivotally connected or otherwise secured to the upper casing, so that the upper section of the waffle iron can be raised to allow for the pouring of the batter onto the lower plate, and also to allow for the removal of the cooked waffle.

Figure 3:
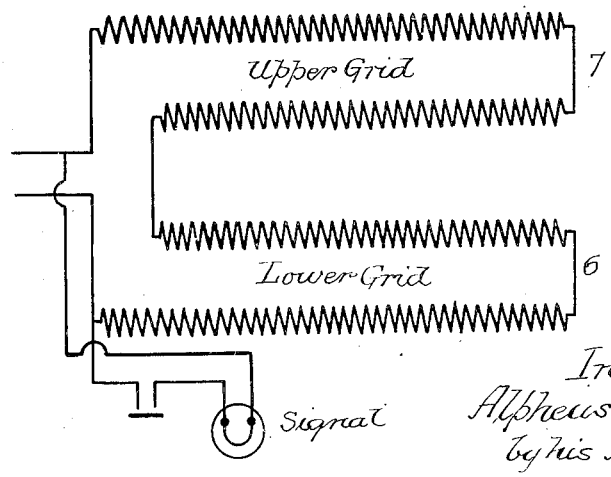
Fig. 3 is a diagram showing the electric circuit.

The two plates may have any of the usual projections which are common in waffle irons, so as to provide an extended surface for the proper cooking of the waffle. The plate 3 is heated by a series of electric wires 6, while the upper plate is heated by a series of electric wires 7, said wires being confined within the flanges of the plates and may be arranged in any of the ordinary forms. Fig. 3 shows a diagram of the wiring of the two sections of the iron. The plates in the present instance are made of aluminum or an alloy of aluminum, but they may be made of other similar metal if desired.

Depending from the lower plate 3 are two lugs 9 and 10, one being located at one side of the plate, and the other at the opposite side, the lugs being a sufficient distance apart to provide for the proper expansion and contraction of the plate. In the lug 9 is a threaded opening for the threaded section 11 of the rod 12 of "invar" steel or other low expansive metal. The lug is split for the opening and a clamp screw 13 connects the two sections of the lug so as to clamp the threaded portion 11 within the lug with sufficient friction to prevent accidental movement of the rod after adjustment. On the end of the rod 12 is a handle 14 by which it can be turned, and on the rod is a ratchet wheel 15 held in any position in which it is adjusted by a spring pawl 16. These details of construction may be varied without departing from the essential features of the invention.

The opposite end of the rod 12 is reduced at 17 and passes through an opening in the lug 10, bearing against an arm 19, which is pivoted at 20 to the lug 10. The spring 21 is attached to a hook on this pivoted arm and to any fixed point of the waffle iron, the spring tending to hold the arm against the end of the rod. On the end of the arm is a non-conducting section 22 which has a contact plate 23 which is mounted in a slot in the section 22 and held therein, in the present instance, by a pin 24. This contact plate is arranged to bear against the two terminals 25 and 26 on a non-conducting block 27 secured to the lug 10.

When the plate 3 expands under heat, the two lugs 9 and 10 will be moved apart, and as the rod 12 is attached to the lug 9 it will move away from the arm 19, the spring 21 drawing the plate 23 on said arm in contact with the terminals 25 and 26, illuminating in the present instance an electric lamp 28 which is mounted in a socket 29 having a wire 30 leading to the terminal 25. Another wire 31 leads to one of the main terminals 32 of the iron. The other terminal 33 is connected by a wire 34 to the terminal 26. The main terminals 32 and 33 are connected by wires 35, 36, 37 and 38, respectively, to the two heating wires 6 and 7 of the waffle iron.

It will be understood that in place of the electric light bulb, an electric bell or other signal may be used without departing from the essential features of the invention.

The operation is as follows:

The iron is first brought to the proper heat for cooking a waffle. This is accomplished by turning on the current, and when the electric light bulb 28 is illuminated, the iron is at the proper heat to pour the batter. When the batter has been placed upon the lower plate 3 of the iron, the iron becomes chilled, and the current is then on, and the waffle will cook by the heated plates of the iron until the waffle is done, and this is noted by the relighting of the bulb. This is made possible by the expansion of the bottom plate 3, which will cause the rod 12 to move away from the pivoted arm 19 and allow its contact plate 23 to come in contact with the two terminals 25 and 26, which directly connect the bulb with the main circuit. The waffle iron is then opened and the waffle removed, and another quantity of batter is placed on the lower iron which will become chilled and which will contact immediately, breaking the lamp circuit, and by the rod 12 pushing the pivoted arm 19 away from the terminals 25 and 26. The rod 12 can be adjusted by turning the handle 14 either to the right or left, so as to advance or retard the movement of the pivoted arm 19. In this manner the signal will operate in advance, and especially when a "light" waffle is desired, or when it is desired to make a "well done" or very "brown" waffle.

While I have shown in the drawings an electric lamp for giving the signal when the waffle iron is in condition to be used and when the waffle has been cooked, an audible signal, such as a bell, may be used, or other means may be provided for cutting off the current at both the above-mentioned points and then making the connection automatically when the batter has been placed in the iron and when the batter has been completely cooked.

In Fig. 8 I have illustrated a modification, in which there is a supplemental arm 40, which is pivotally mounted on the opposite side of the non-conducting block 27a for the pivoted arm 19a. In this instance the rod 12a extends through the non-conducting block 27a and bears upon the arm 19a which carries the contact plate 23a. The spring 21a moves the arm 19a in contact with the terminals 25a and 26a of the signal circuit, which arm is carried by the arm 40. The spring 41 normally holds the contact plate 42 of the lever 40 in contact with the terminals 43 and 44 of the main heating circuit. The connection is complete but should the expansion of the plate continue, due to the fact that the current is left on, then the arm 19a will push the arm 40 away from the terminals 43 and 44 and break the heating circuit. This will immediately shut off the heating of the plates of the waffle iron, and when the plates have sufficiently cooled, then the rod 12a forces the arm 19a away from the terminals 25a and 26a, and the spring 41 will move the arm 40 with the contact plate 42 towards the terminals 43 and 44 of the lighting circuit.

In the diagram shown in Fig. 11 the contact plate 23 is shown arranged to connect the two terminals 25 and 26 and give a signal, by means of the bell 28a or other signal.

Fig. 12 shows the break in the main heating circuit, the two terminals 43 and 44 being connected by the plate 42, so that the heating circuit is complete, but when the plate is pushed away by the arm 19a due to overheating, then the main circuit is broken and the heating of the plates is continued.

In Fig. 13 is shown another circuit arrangement, in which there is a contact plate 23, arranged to make a contact with the terminals 25 and 26, and another plate 42, making the contact with the terminals 43 and 44, 28 being a lamp or other signal.

In Fig. 9 is shown another modification, in which a secondary member 3b is placed in contact with the underside of the main plate 3a of the waffle iron or other similar cooking utensil. The member 36 is a bi-metal member and is subject to expansion and contraction. The member 36a carries a stem 45 on which are two contact plates 46 and 47. The plate 46 is arranged to come in contact with the terminals 25d and 26d, while the plate 47 is arranged to come in contact with the terminals 43d and 44d of the main heating circuit.

By the above construction, it will be seen that by using the temperature change in the waffle iron plate as a measure of the surface temperature of the material being cooked, I am enabled to obtain a signal, either audible or visible, when the waffle iron is hot enough to receive the batter or when the waffle itself has been properly cooked, and the main heating circuit can be cut off from the waffle iron when the heat has passed the required temperature, and when the plates have become cooled, then the contacts will again be remade and the iron reheated to the proper degree.

It will, of course, be understood that the invention may be applied to the upper plate or to both the lower and upper plates of the waffle iron, without departing from the essential features of the invention.

While the element which supports the material to be cooked has been described as a cooking plate, it will be understood that this element may be any plate-like form or shape capable of being heated to such an extent that material placed thereon or therein will be cooked by the heat of the supporting or containing element as the case may be, the term plate being employed through the following claims for the sake of simplicity.

I claim:

1. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for indicating when said batter has been cooked to said given degree and color, and highly sensitive heat-responsive means for actuating said indicating means, said actuating means being in direct thermal conducting relation with one of said plates so as to be controlled by the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature.

2. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for indicating when said batter has been cooked to said given degree and color, means for stopping the operation of the heating means when said given degree of cooking and surface color has been reached, and highly sensitive heat-responsive means for actuating said indicating means and said stopping means, said actuating means being in direct thermal conducting relation with one of said plates so as to be controlled by the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature.

3. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for stopping the operation of the heating means when said batter has been cooked to said given degree and color, and highly sensitive heat-responsive means for actuating said stopping means, said actuating means being in direct thermal conducting relation with one of said plates so as to be controlled by the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature.

4. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for indicating when said batter has been cooked to said given degree and color, means for stopping the operation of the heating means when said given degree of cooking and surface color has been reached, highly sensitive heat-responsive means for actuating said indicating means and said stopping means, said actuating means being in direct thermal conducting relation with one of said plates so as to be controlled by the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature, and means for adjusting the actuating means to obtain any desired degree of cooking and surface color of the cooked batter, said surface color changing coordinately with the changing of the surface temperature of the batter.

5. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for indicating when said batter has been cooked to said given degree and color, and means controlled by expansion and contraction of one of said plates for actuating said indicating means in accordance with the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature.

6. In a waffle iron or similar cooking utensil, a pair of superposed cooking plates formed to provide a shallow chamber therebetween for the reception of batter, means for heating said plates to raise the temperature of said batter to surface cook or sear the same, the thin body of batter within said chamber being properly cooked to a given degree and surface color when its surface temperature reaches a definite value, means for indicating when said batter has been cooked to said given degree and color, means for stopping the operation of the heating means when said given degree of cooking or surface color has been reached, and means controlled by expansion and contraction of one of said plates for actuating said indicating means in accordance with the temperature of the plate, said plate having such characteristics that the contact of raw batter with a surface thereof exercises an immediate effect through said plate on said actuating means, and the temperature of said plate varies in such relation to the surface temperature of the batter that it has a definite value corresponding to said definite value of said surface temperature.

ALPHEUS O. HURXTHAL.